(12) United States Patent
Hinz et al.

(10) Patent No.: US 7,204,565 B2
(45) Date of Patent: Apr. 17, 2007

(54) ELECTROHYDRAULIC ASSEMBLY FOR AN ELECTRONICALLY CONTROLLED BRAKE SYSTEM

(75) Inventors: Axel Hinz, Neu-Anspach (DE); Stefan A. Schmitt, Johannesberg (DE); Martin Baechle, Glashütten (DE); Uwe Greiff, Bad Homburg (DE); Ronald Kley, Seligenstadt (DE); Michael Hitzel, Rödermark (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 11/126,757

(22) Filed: May 11, 2005

(65) Prior Publication Data

US 2005/0253451 A1  Nov. 17, 2005

(30) Foreign Application Priority Data

May 13, 2004   (DE) ..................... 10 2004 024 060

(51) Int. Cl.
*B60T 13/16* (2006.01)

(52) U.S. Cl. ..................................... 303/10; 303/116.4
(58) Field of Classification Search ................ 417/273, 417/554; 303/10, 11, 116.4
See application file for complete search history.

(56) References Cited

U.S. PATENT DOCUMENTS

| | | | | |
|---|---|---|---|---|
| 5,167,493 A | * | 12/1992 | Kobari ........................ 417/273 |
| 5,564,909 A | * | 10/1996 | Rischen et al. ............. 417/273 |
| 5,626,466 A | * | 5/1997 | Ruoff et al. ................. 417/273 |
| 5,642,988 A | * | 7/1997 | Zorn .......................... 417/273 |
| 5,716,111 A | | 2/1998 | Schenk et al. |
| 5,895,207 A | * | 4/1999 | Burgdorf et al. .......... 417/410.1 |
| 5,992,944 A | * | 11/1999 | Hara ............................ 303/10 |
| 6,030,185 A | * | 2/2000 | Feigel et al. ................ 417/273 |
| 6,078,118 A | * | 6/2000 | Reinartz et al. .............. 310/89 |
| 6,082,244 A | * | 7/2000 | Siegel et al. .................. 92/78 |
| 6,093,003 A | * | 7/2000 | Hauser et al. .............. 417/541 |
| 6,146,115 A | * | 11/2000 | Alaze ......................... 417/549 |
| 6,164,731 A | * | 12/2000 | Nakazawa et al. ....... 303/116.1 |
| 6,234,588 B1 | * | 5/2001 | Sawada ................... 303/119.1 |

(Continued)

FOREIGN PATENT DOCUMENTS

DE           37 27 174 A1      2/1989

(Continued)

*Primary Examiner*—Chris Schwartz
(74) *Attorney, Agent, or Firm*—RatnerPrestia

(57) ABSTRACT

The invention relates to an electrohydraulic assembly for an electronically controlled brake system with an accommodating member which includes accommodating bores for electrohydraulic valves, accommodating bores for hydraulic supply devices and an accommodating bore for at least one roller bearing, and with hydraulic channels and pressure fluid ports, as well as with an electric motor comprising a rotor with a shaft that is mounted with the roller bearing in the associated accommodating bore in the accommodating member and used to drive the supply devices, and with an electronic control unit being connected to the electric motor by means of a plug penetrating a through-bore in the accommodating member.

The objective is to provide a safe and comfortable operating characteristics even in consideration of extreme environmental influences.

This object is achieved because the electrohydraulic assembly includes at least two brake circuits and at least two supply devices per brake circuit, and because the accommodating bores for the supply devices are arranged on top of each other along a first imaginary plane that extends in parallel to the shaft.

9 Claims, 2 Drawing Sheets

U.S. PATENT DOCUMENTS 6,302,663 B1 * 10/2001 Schuller et al. ............. 417/554
6,446,435 B1 * 9/2002 Willmann et al. ............ 60/533
6,792,968 B1 * 9/2004 Breeden ................ 137/315.01

FOREIGN PATENT DOCUMENTS

| DE | 197 55 678 A1 | 7/1998 |
| DE | 198 51 762 A1 | 1/2000 |
| DE | 101 40 918 A1 | 12/2002 |
| EP | 1 036 943 A1 | 9/2000 |

* cited by examiner

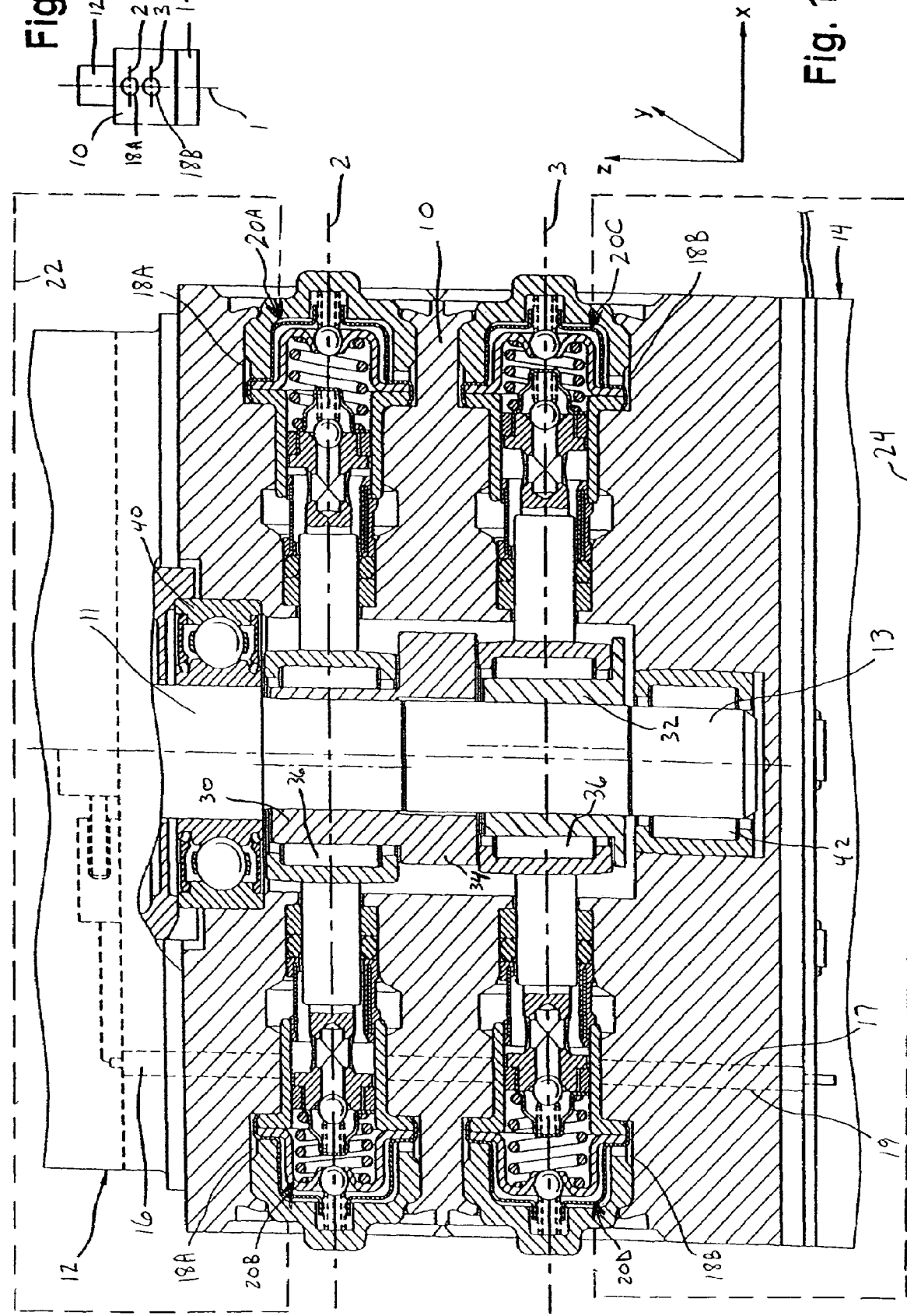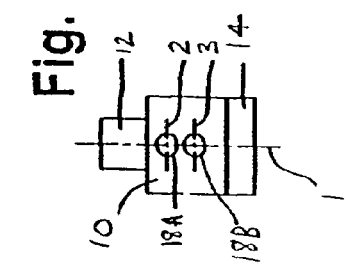

ELECTROHYDRAULIC ASSEMBLY FOR AN ELECTRONICALLY CONTROLLED BRAKE SYSTEM

TECHNICAL FIELD

The present invention relates to an electrohydraulic assembly for an electronically controlled brake system with an accommodating member which includes accommodating bores for electrohydraulic valves, accommodating bores for hydraulic supply devices and an accommodating bore for at least one roller bearing, and with hydraulic channels and pressure fluid ports, as well as with an electric motor comprising a rotor with a shaft that is mounted with the roller bearing in the associated accommodating bore in the accommodating member and used to drive the supply devices, and with an electronic control unit being connected to the electric motor by means of a plug penetrating a through-bore in the accommodating member.

BACKGROUND OF THE INVENTION

Generic electrohydraulic assemblies are employed in motor vehicles to a large extent. The range of functions of electrohydraulic assemblies of this type is constantly increasing. This is because new tasks such as wheel-individual brake control, cruise control and collision avoidance control, hill holders (hill descent control) or brake disc dehumidification due to the automatic application of brake pads add to the conventional tasks such as ABS, ESP, and brake assist systems.

With the range of functions increasing, also control operations become more frequent, which are related to activities of the supply devices. One supply device per brake circuit is provided in conventional assemblies, being primarily used for the return delivery of hydraulic fluid discharged at the side of the wheel brakes or for the pressure increase in wheel brakes. However, the activity of the supply devices entails reactive effects such as pedal vibrating due to pressure surges or acoustic trouble due to structure-borne noise.

To eliminate drawbacks in comfort it has already been considered implementing a gear pump in an electrohydraulic brake system. In systems of this type, the operator is uncoupled from the hydraulic actuation, and actuation takes place by-wire. The supply device (gear pump) serves to charge a high-pressure accumulator so that pedal reactions are omitted.

Another problem refers to the fluid behavior at extreme temperatures, however. This is because the hydraulic medium 'brake fluid' is extremely viscous at low temperatures, while it is mobile at high temperatures. Both extremes represent a special challenge.

BRIEF SUMMARY OF THE INVENTION

In view of the above, an object of the invention is to provide an electrohydraulic assembly, which exhibits an especially compact construction and a safe and comfortable operating characteristics even in consideration of extreme environmental influences.

According to the invention, this object is achieved with the features of the independent patent claim.

BRIEF DESCRIPTION OF THE DRAWINGS

FIG. 1 shows a cross-sectional view of an electrohydraulic assembly.

FIG. 2 shows a schematic representation of a side view of the electrohydraulic assembly of FIG. 1.

DETAILED DESCRIPTION OT THE PREFERRED EMBODIMENTS

Figure 3:
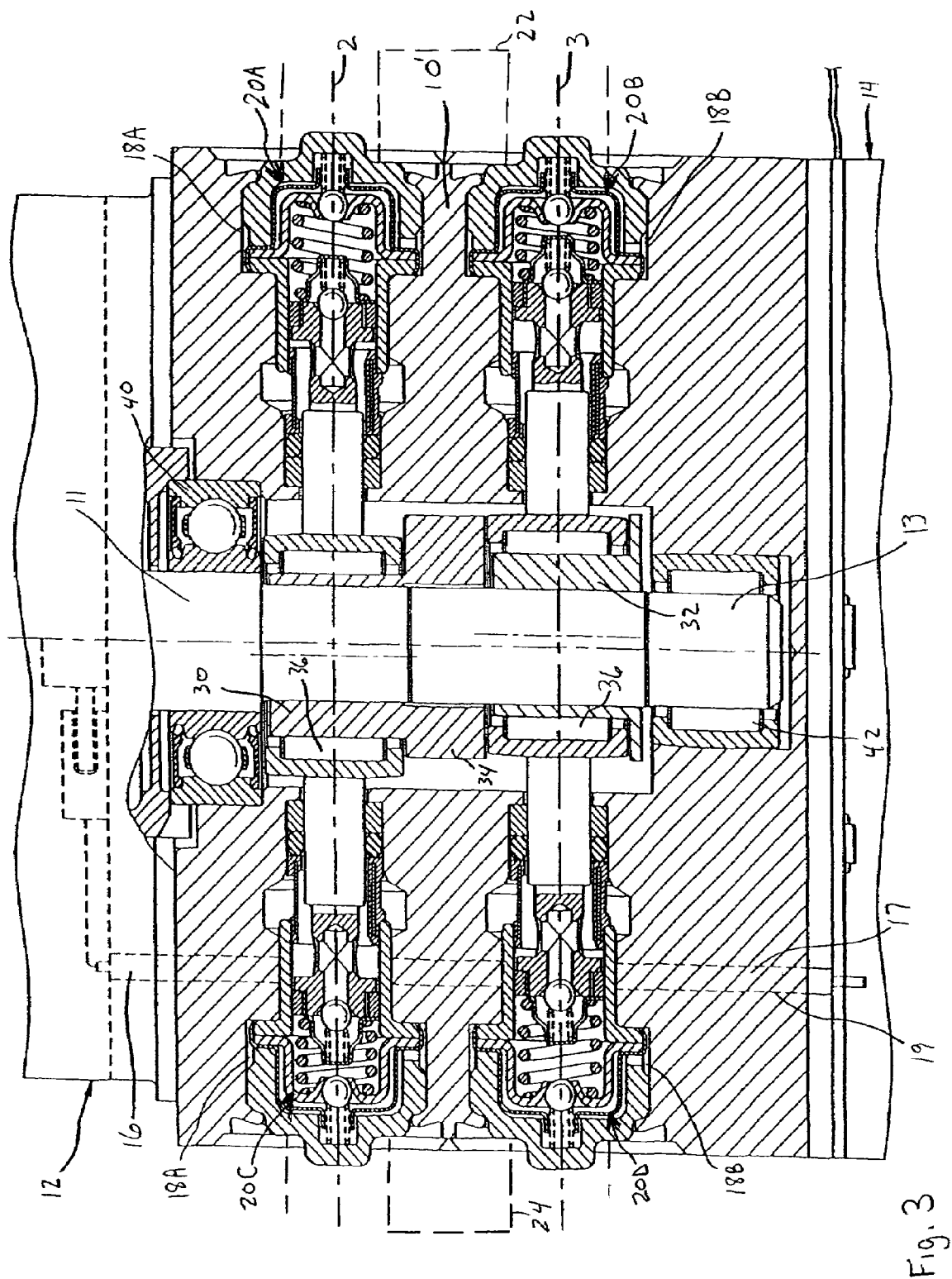
FIG. 3 shows a cross-sectional view of an electrohydraulic assembly that is an alternate embodiment of the present invention.

An electrohydraulic assembly for an electronically controlled brake system comprises an accommodating member 10 as a valve block or pump block, in which diagrammatically shown supply devices 20A–20D (pumps) are arranged, being driven by way of a shaft 11 of a motor 12. Said pumps 20A–20D deliver hydraulic fluid from an inlet to an outlet. The pumps 20A–20D may e.g. be configured as return pumps for returning braking fluid out of wheel brakes (not shown) into a supply tank (not shown). Further, it is possible that the pumps 20A–20D feed the wheel brakes (not shown) of the brake system for pressure increase purposes. Also, it is principally feasible that the pumps 20A–20D are used to charge one or more high-pressure accumulators (not illustrated) in an electrohydraulic brake system. Mixed forms in any desired combination of the above variants are possible.

An electronic control unit 14 is provided on a side of the accommodating member 10 opposite to the motor 12. The control unit 14 includes a board equipped with electronic components. For the electrically conductive connection, in particular for current supply, the motor 12 is connected to the board of the control unit 14 in an electrically conductive manner by way of a contact element 17. The contact element 17 extends through a through-bore 19 of the accommodating member 10 for this purpose. The contact element can be designed as a separate component being inserted with male plug contacts of the flat-plug type into female counterparts in the area of a brush holder plate (additionally configured as an end plate) of the motor. Male plug contacts that are connected to the board of the control unit may also be provided at the opposite end of the plug 16. It is self-explanatory that variants (not shown) are feasible with respect to the contact element without departing from the spirit of the invention. For example, the contact element can be fixed at a motor component, in particular a brush holder plate or an end plate. It is, however, also possible to provide the contact element 17 in a fixed fashion at the control unit 14 which is advantageous because the elements are grouped in a subassembly, with electric and electronic elements being generally concentrated in the area of the control unit 14. The construction in detail can vary depending on the design and can be realized accordingly.

It is conventional that magnetic valves are arranged partly in the control unit 14 and partly in the accommodating member 10, and valve coils and valve domes of the magnetic valves are largely disposed inside a control unit housing. Further, pressure sensors can be integrated into the valve block, their data being used for the control.

The following correlations are particularly significant for the invention.

At least two supply devices 20A and 20B; 20C and 20D, respectively, are associated with each brake circuit 22, 24 (shown in phantom) of the brake system and the electrohydraulic assembly 10. As explained above, each brake circuit 22, 24 can have various components there along and can be configured to achieve different functions. Different adaptation possibilities are the result. The following information relates in each case to prior art radial piston pumps for vehicle brake systems wherein one piston is provided for each brake circuit. When the piston dimensions and the stroke are maintained to be constant for both supply devices 20A and 20B; 20C and 20D per brake circuit 22, 24, respectively, the supply volume will be doubled. The required operation of the supply devices 20A–20D becomes shorter which will reduce impairing noise. The pressure pulsations are output per brake circuit 22, 24 with double frequency and half amplitude so that also the loudness will diminish. Further, adapting the piston geometry and the stroke renders it possible to share the previous supply volume between the two independent supply devices 20A and 20B; 20C and 20D. The exact dimensioning of the geometry and adaptation, depending on the objective of adaptation, is the responsibility of the one skilled in the art.

Further, the accommodating bores 18A, 18B for the supply devices 20A–20D are arranged one upon the other along a first imaginary plane 1 extending in parallel to the shaft 11, as shown in FIG. 2. Due to the supply devices 20A and 20C; 20B and 20D being quasi aligned, it is possible to greatly reduce the space requirement in the accommodating member 10, although at least four supply devices 20A–20D are provided in total.

The supply devices 20A and 20B; 20C and 20D of each brake circuit 22, 24, respectively, are arranged quasi on different levels being described by second and third imaginary planes 2, 3 provided along and spaced from a z-coordinate and extending between x and y-coordinates. A first pair of the supply devices 20A and 20B is arranged in a second imaginary plane 2 extending orthogonal to the shaft 11. A second pair of the supply devices 20C and 20D is arranged in a third imaginary plane 3 extending in parallel to the second imaginary plane 2. This level is roughly disposed on one plane with the electrohydraulic valves incorporated in the accommodating member 10. In total, the supply devices 20A and 20B; 20C and 20D of each brake circuit 22, 24, respectively, are disposed on a uniform level. More specifically, the supply devices 20A and 20B of the first brake circuit 22 are arranged in each case jointly within the second plane 2, while the supply devices 20C and 20D of the second brake circuit 24 are respectively arranged jointly within the third plane 3.

In a modified, yet particularly suction-optimized embodiment of the accommodating member 10' shown in FIG. 3, with low suction resistances due to a short channel length in the suction path, all supply devices 20A and 20B; 20C and 20D of one brake circuit 22, 24, respectively, are arranged on the right (or, with respect to the other brake circuit) on the left of the shaft 11, yet on different levels (planes 2 and 3). The eccentrics 30, 32 are offset by 180° with respect to each other on the shaft 11.

In general, the supply devices 20A–20D are designed as stepped piston pumps, what improves their aspiration behavior because large suction cross-sections are provided on the suction side of the pump pistons.

In order to impart a wear-resistant design to the accommodating member 10 that is preferably made of aluminum, without special provisions such as bushings or a coating with a mechanically resistant material/anodic oxidation, opposed supply devices 20A and 20B; 20C and 20D, in the embodiment of FIG. 1, are designed as being axially offset in relation to each other. More specifically, the accommodating bores 18A, 18B for opposed supply devices cannot be designed in one single operation with one single tool. An independent accommodating bore 18A, 18B must be arranged for each supply device 20A–20D. A particularly favorable method of manufacturing the accommodating member 10 with the accommodating bores 18A, 18B for the pairwise opposed supply devices is described in the applicant's German patent application DE 102004016071.6 dated 30 Mar. 2004 which is not prior published.

As can be seen in the drawing, the rotor includes an undivided shaft 11 with at least two eccentrics 30, 32 for driving the supply devices 20A–20D. The eccentrics 30, 32 are rotated by 90° relative to each other in the embodiment shown.

The eccentrics 30, 32 can be configured as separate components and press fitted or shrunk onto the shaft 11. To compensate unbalanced mass, the shaft 11 carries a balancing weight 34 interposed between the two eccentrics 30, 32. To reduce the number of components to be mounted, the balancing weight 34 and one eccentric 30 are adapted to be configured as one integral component.

An independent eccentric bearing 36 is allocated to each eccentric 30, 32. With the given 90°-arrangement of the eccentrics 30, 32, only one eccentric performs the pressure stroke in each case, what reduces the load on the bearing compared to other arrangements and allows a long useful life.

The following shall be noted with regard to the arrangement of bearings in the assembly. The shaft includes a first bearing interposed between an end plate and the supply devices within the second plane 2. A second plane supports a shaft end close to the control unit 14. In addition, the motor 12 comprises a so-called spherical bearing (sliding bearing) which supports the shaft end close to the motor housing in a preferably bowl-shaped motor housing.

What is claimed is:

1. An electrohydraulic assembly for an electronically controlled brake system including at least first and second brake circuits, the electrohydraulic assembly comprising:

an accommodating member;

a shaft bore extending into the accommodating member along a shaft axis and configured to receive a motor driven shaft;

a first accommodating bore extending into the accommodating member along a first axis which is in a first plane generally orthogonal to the shaft axis, the first accommodating bore configured to receive a hydraulic supply device;

a second accommodating bore extending into the accommodating member along a second axis which extends in the first plane, the second accommodating bore configured to receive a hydraulic supply device;

a third accommodating bore extending into the accommodating member along a third axis which is in a second plane parallel to the first plane, the third accommodating bore configured to receive a hydraulic supply device;

a fourth accommodating bore extending into the accommodating member along a fourth axis which extends in the second plane, the fourth accommodating bore configured to receive a hydraulic supply device;

wherein the first and third axes both extend along a third plane parallel to the shaft axis and the second and fourth axes both extend along a fourth plane parallel to the shaft axis;

wherein two of the accommodating bores are in fluid communication with the first brake circuit while the other two accommodating bores are in fluid communication with the second brake circuit and the motor driven shaft is configured to actuate each of the hydraulic supply devices; and wherein the shaft includes a first eccentric aligned with the first and second accommodating bores and a second eccentric aligned with the third and fourth accommodating bores, the first and second eccentrics being separate components each of which is rotatable relative to the shaft prior to securement thereto such that the eccentrics are secured to the shaft with a desired phase-shift therebetween.

2. The electrohydraulic assembly as claimed in claim 1, wherein the shaft carries a balancing weight.

3. The electrohydraulic assembly as claimed in claim 2, wherein the balancing weight is interposed between two eccentrics.

4. The electrohydraulic assembly as claimed in claim 3, wherein the balancing weight and one eccentric are configured as an integral component.

5. The electrohydraulic assembly as claimed in claim 1, wherein the third and fourth planes are non-parallel to one another and the phase-shift between the first and second eccentrics is less than 180°.

6. The electrohydraulic assembly as claimed in claim 5, wherein the phase-shift between the first and second eccentrics is approximately 90°.

7. The electrohydraulic assembly as claimed in claim 1, wherein the supply devices positioned in the first and second accommodating bores are in fluid communication with the first brake circuit and the supply devices positioned in the third and fourth accommodating bores are in fluid communication with the second brake circuit.

8. The electrohydraulic assembly as claimed in claim 1, wherein the third and fourth planes are parallel to one another and offset in relation to each other.

9. The electrohydraulic assembly as claimed in claim 1, wherein the supply devices positioned in the first and third accommodating bores are in fluid communication with the first brake circuit and the supply devices positioned in the second and fourth accommodating bores are in fluid communication with the second brake circuit.

\* \* \* \* \*